(12) United States Patent
Fu et al.

(10) Patent No.: US 9,542,255 B2
(45) Date of Patent: Jan. 10, 2017

(54) TROUBLESHOOTING BASED ON LOG SIMILARITY

(71) Applicant: EMC Corporation, Hopkinton, MA (US)

(72) Inventors: Yu Fu, Shanghai (CN); Chao Chen, Shanghai (CN); Tianqing Wang, Shanghai (CN); Qianjie Zhong, Shanghai (CN); Qiyan Chen, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 14/489,004

(22) Filed: Sep. 17, 2014

(65) Prior Publication Data
US 2015/0089309 A1    Mar. 26, 2015

(30) Foreign Application Priority Data
Sep. 23, 2013  (CN) .......................... 2013 1 0441156

(51) Int. Cl.
*G06F 11/07*  (2006.01)
(52) U.S. Cl.
CPC ......... *G06F 11/079* (2013.01); *G06F 11/0724* (2013.01)
(58) Field of Classification Search
USPC ......................................................... 714/26
See application file for complete search history.

(56) References Cited

U.S. PATENT DOCUMENTS

| | | | | |
|---|---|---|---|---|
| 5,463,768 A * | 10/1995 | Cuddihy | ............... | G06F 11/079 714/37 |
| 6,381,710 B1 * | 4/2002 | Kim | .................... | G06F 11/0781 714/45 |
| 6,795,935 B1 * | 9/2004 | Unkle | ................ | G05B 23/0275 340/438 |
| 7,266,726 B1 * | 9/2007 | Ladd | ................... | G06F 11/2268 714/27 |
| 7,457,991 B1 * | 11/2008 | Teague | ................. | G06F 11/008 714/47.1 |
| 8,321,723 B2 * | 11/2012 | Ladd | ....................... | G06F 21/83 714/48 |
| 8,452,761 B2 * | 5/2013 | Sabato | ............... | G06F 11/0769 707/723 |

(Continued)

*Primary Examiner* — Kamini Patel
(74) *Attorney, Agent, or Firm* — Krishnendu Gupta; Konrad R. Lee (57) ABSTRACT

The present disclosure relates to a method and apparatus for troubleshooting based on log similarity. In one embodiment, there is provided a method for troubleshooting based on log similarity, comprising: extracting log patterns from multiple log files in response to having collected the multiple log files from at least one system with troubles, the log pattern describing a regular expression to which a log message in a log file among the multiple log files conforms; building a pattern repository using the log patterns; mapping each of the multiple log files to an n-dimensional vector based on the pattern repository; and clustering multiple n-dimensional vectors to which each of the multiple log files is mapped into at least one group, wherein each of the at least one group indicates one trouble type of the at least one system. In another embodiment, there is provided a corresponding apparatus.

14 Claims, 7 Drawing Sheets

(56) References Cited

U.S. PATENT DOCUMENTS

| | | | | |
|---|---|---|---|---|
| 8,707,194 B1* | 4/2014 | Jenkins | ............ | H04L 29/08099 715/772 |
| 2005/0015685 A1* | 1/2005 | Yamamoto | .......... | G06F 11/0727 714/54 |
| 2009/0240800 A1* | 9/2009 | Yee | ......................... | G06F 21/83 709/224 |
| 2013/0311137 A1* | 11/2013 | Schaum | ................. | G06F 17/18 702/181 |
| 2014/0244191 A1* | 8/2014 | Oka | .................... | G01R 21/133 702/61 |
| 2014/0245085 A1* | 8/2014 | Halverson | ........... | G06F 11/0766 714/57 |
| 2015/0142707 A1* | 5/2015 | Charif | .................. | G06N 99/005 706/12 |
| 2015/0280968 A1* | 10/2015 | Gates | ................. | G06F 11/0709 714/37 |

* cited by examiner

TROUBLESHOOTING BASED ON LOG SIMILARITY

RELATED APPLICATION

This application claims priority from Chinese Patent Application Serial No. CN201310441156.9 filed on Sep. 23, 2013 entitled "METHOD AND APPARATUS FOR TROUBLESHOOTING BASED ON LOG SIMILARITY," the content and teachings of which are hereby incorporated by reference in their entirety.

FIELD

Embodiments of the present invention relate to troubleshooting, and more specifically, to a method and apparatus for troubleshooting based on log similarity.

BACKGROUND

As complexity of computer hardware system increases and functionality of software systems are enhanced, when a computer system (e.g., comprising hardware and software) is running on different hardware systems, its running environment becomes increasingly complex. Therefore, the system might encounter various kinds of troubles. For example, with the development of multi-core processor techniques, increasingly computing devices employ one or more processors with multi-cores, which increases the possibility of occurrence of processor troubles. Another example, with the complication of applications, the system might be confronted with other types of troubles, such as memory leaks.

In current scenarios including various application systems, typically there exists a relatively good log recording module, which is capable of recording various status of hardware/software systems during running. Generally when a trouble occurs in a system, a customer using the system can feed back details of the trouble to the system provider, and then the system provider will dispatch a technical engineer to handle the trouble.

In practical application and implementations such phenomenon may exist. For example, a server system A which a customer A is using has a trouble during running, a log file being recorded at this point is A, and through analysis a technical engineer A finds server system A has a memory leak and performs troubleshooting. Later, a server system B with the same model, which a customer B is using has a trouble, and a log file being recorded is B, when the server provider might dispatch another technical engineer B to tackle the problem.

Technical engineer B conducts on-site inspection and retrieves the failing system's historic logs from a log database, and finds that the possible causes of the trouble and determines server system B also has a memory leak. Typically, technical engineers analyze log files, identify troubles, and perform troubleshooting. All these efforts are based on the Users (engineers) experience and require a lot of manual diagnosis.

SUMMARY

Therefore, it is desired to develop and implement a technical solution capable of diagnosing and handling failures based on log similarity, and it is desired that the technical solution can cluster existing historic log files into groups representing different failure types (such as processor failure, memory leak, etc.), and embodiments of the present invention leverage log similarities to assist technical engineers/users in deciding possible causes of failure or troubles Further, it is desired the technical solution can, upon receiving a new log file from another failing system, compare the new log file with historic log files in existing groups so as to categorize the new log file into a specific failure type. In this manner, it helps to look for technical engineers who have such troubleshooting experience, so as to reduce time and human costs.

Embodiment of the present invention, there is provided an apparatus and method for troubleshooting based on log similarity, comprising: extracting log patterns from plurality of (hereinafter also referred to as multiple) log files in response to having collected the multiple log files from at least one system with troubles or failures, the log pattern describing a regular expression to which a log message in a log file among the multiple log files conforms; building a pattern repository using the log patterns; mapping each of the multiple log files to an n-dimensional vector based on the pattern repository; and clustering multiple n-dimensional vectors to which each of the multiple log files is mapped into at least one group, wherein each of the at least one group indicates one trouble type of the at least one system.

In one embodiment of the present invention, the mapping each of the multiple log files to an n-dimensional vector based on the pattern repository comprises: with respect to a log file j among the multiple log files, matching each line of log message k in the log file j to a corresponding log pattern $p_k$ in the pattern repository; transforming the log file j into a sequence $f_j$ of the corresponding log pattern $p_k$; and mapping the sequence $f_j$ to an n-dimensional vector.

In a further embodiment of the present invention, the mapping the sequence $f_j$ to an n-dimensional vector comprises: with respect to a log pattern $p_i$ in the pattern repository, calculating an eigenvalue $tfidf_{i,j}$, the eigenvalue associated with the sequence $f_j$ and the log pattern $p_i$, the eigenvalue $tfidf_{i,j}$ further associated with an occurrence frequency of the log pattern $p_i$ in multiple sequences corresponding to the multiple log files; and treating the eigenvalue $tfidf_{i,j}$ as the $i^{th}$ component in the n-dimensional vector to build the n-dimensional vector.

In a further embodiment of the present invention, there is provided a method for troubleshooting based on log similarity, comprising: calculating similarity between a new log file and multiple vectors in at least one group in response to having received the new log file from the system, the at least one group being obtained based on the method described above; and treating a failure type indicated by a group to which a vector with the highest similarity belongs as a failure type of the system.

In yet a further embodiment of the present invention, the calculating the similarity between a new log file and multiple vectors in at least one group in response to having received the new log file from a system comprises: based on the pattern repository in the above method, mapping the new log file to an n-dimensional vector; and calculating the similarity between the n-dimensional vector and the multiple vectors.

The apparatus comprises one or more modules as disclosed in the detailed description that are configured to perform specific steps of the method as disclosed above. The methods and apparatuses according to the various embodiments of the present invention can be implemented without changing the existing log recording mechanism of a system. Specifically, by collecting historic log files from a failing system and clustering them into groups that reflect different failure types, it is possible to provide a diagnosis mechanism for assisting troubleshooting in advance. When later discovering a failure occurs in a system, a new log file from the system may be compared with historic log files clustered into different groups, and then a historic log file with the highest similarity is selected, whereby a failure type of the system is obtained.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus the description herein should not be construed to be limited to the embodiments disclosed herein. On the contrary, those embodiments are provided for the thorough and complete understanding of the present disclosure, and completely conveying the scope of the present disclosure to those skilled in the art, but are exemplary in nature.

Figure 1:
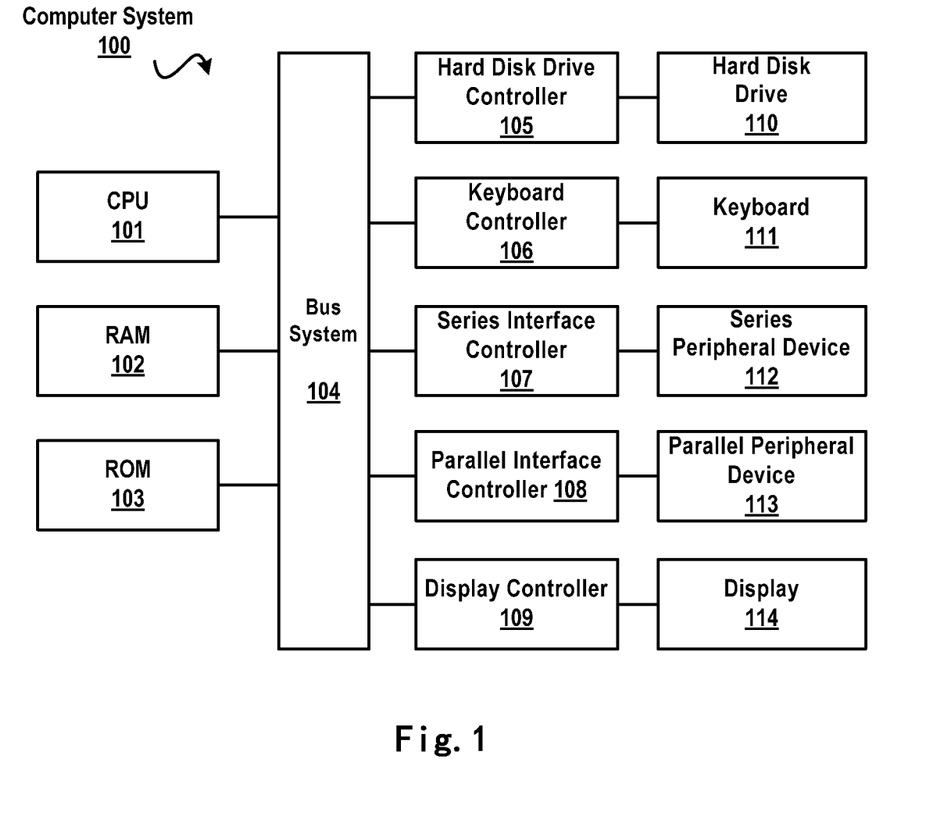
FIG. 1 schematically illustrates a block diagram of an exemplary computer system which is applicable to implement the embodiments of the present invention.

FIG. 1 illustrates an exemplary general purpose computer system 100, which is applicable to implement the embodiments of the present invention. As illustrated in FIG. 1, the general purpose computer system 100 (hereinafter referred to as computer system) may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for exemplary purpose rather than being in any way a limitation to the present disclosure. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Generally as referred herein, a computer readable storage medium may be any tangible medium that can contains, or stores a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
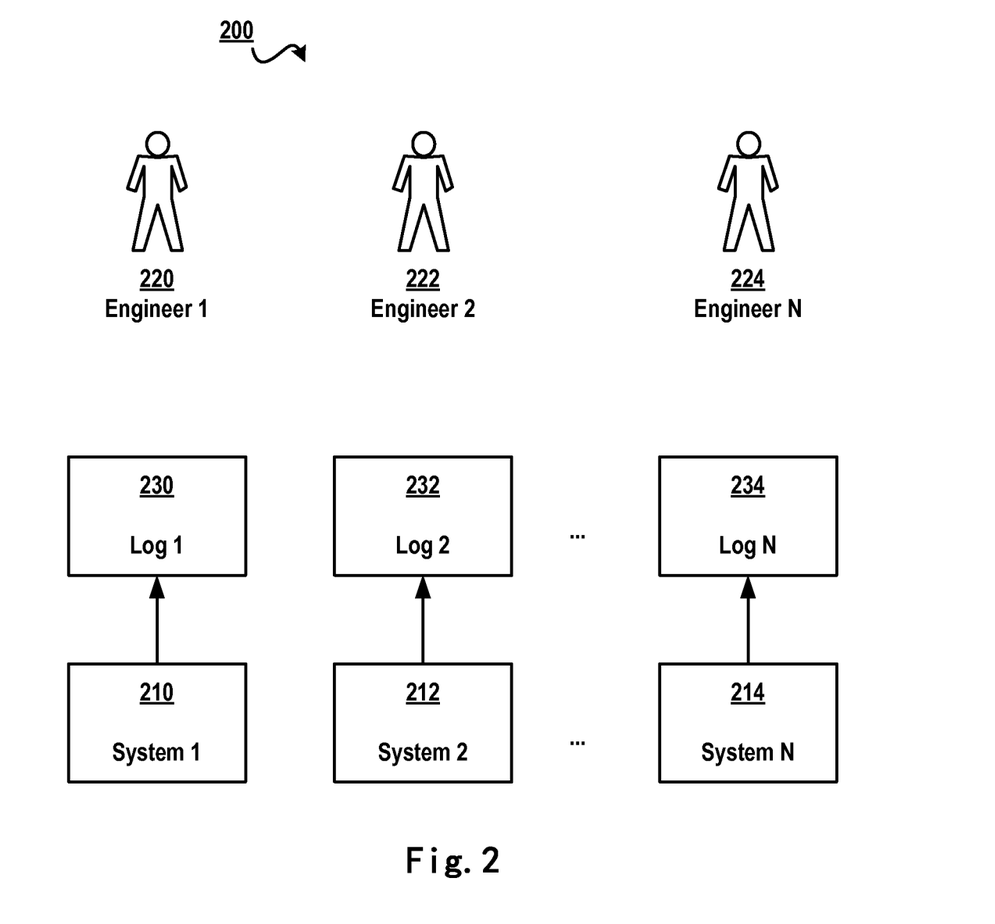
FIG. 2 schematically illustrates a schematic view of a method for troubleshooting according to one solution.

FIG. 2 schematically illustrates a schematic view 200 of a method for troubleshooting according to one exemplary solution. As illustrated in FIG. 2, logs of systems 1 210, 2 212 and N 214 correspond to logs 1 230, 2 232 and N 234, respectively, and when the system has a trouble or has encountered a failure, data related to the trouble (hereinafter also referring to a failure) are recorded in a corresponding log. For example, when systems at different customers have troubles, a provider of the systems usually dispatches different engineers to tackle the troubles. At this point, an engineer 1 220 is dispatched to analyze log 1 230 and performs troubleshooting in system 1 210, an engineer 2 222 is dispatched to analyze log 2 232 and performs troubleshooting in system 2 212, etc.

In this manner, although troubles in the various systems can be solved eventually, since experience of various engineers might vary, e.g., some engineers are best at handling problems such as memory leaks and others are good at handling processor abnormality, it is therefore preferable to diagnose the type of a trouble/failure in advance and then dispatch a suitable engineer to solve the problem at hand. According to the method shown in FIG. 2, before an engineer analyzes a log file of any failing system, the trouble/failure type of the system cannot be determined easily, let alone dispatch the most suitable engineer. The problem of this solution lies in that on the one hand each engineer is required to have comprehensive professional experience, and on the other hand advantages of each engineer cannot be brought into near complete operation.

Regarding systems having the same type of troubles, in general their log contents usually have similarity to some extent. For example, contents "Java heap out of memory" might appear repetitively in a log file of a system whose memory has a trouble. At this point, if it is found that a system shuts down due to failure and contents "Java heap out of memory" appear repetitively in its log file, then it may be considered that the failing system's memory may possibly have failed.

Figure 3:
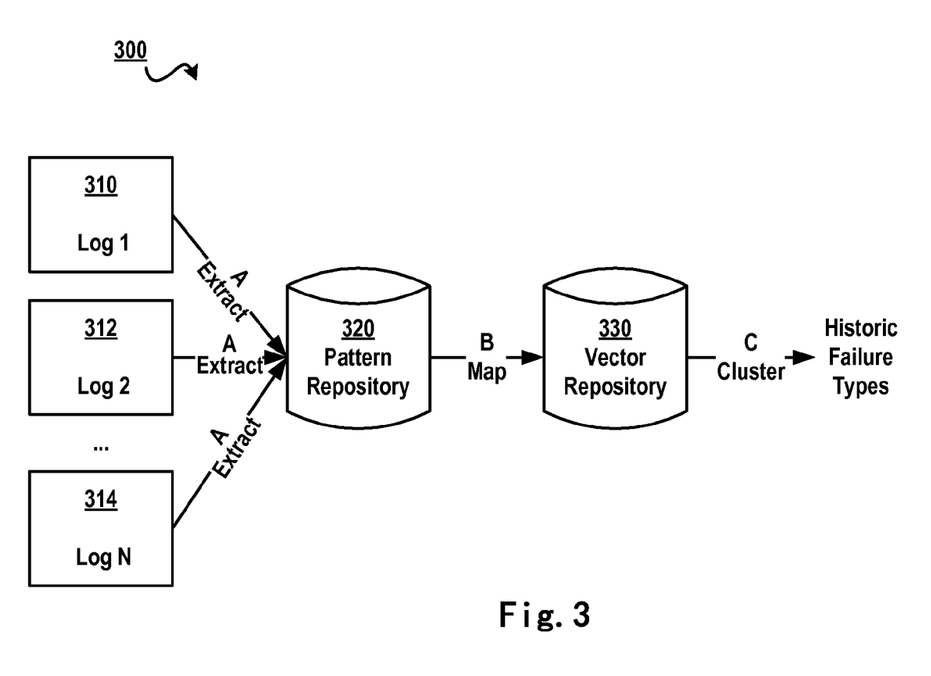
FIG. 3 schematically illustrates an architecture diagram of a method for troubleshooting based on log similarity according to one embodiment of the present invention.

Based on this principle, embodiments of the present invention provide a method for troubleshooting based on log similarity. Note that the log similarity mentioned in the embodiments of the present invention refers to similarity in text that is recorded in log files. Specifically, FIG. 3 schematically illustrates an architecture diagram 300 of a method for troubleshooting based on log similarity according to one embodiment of the present invention. In this embodiment, first, logs 1 310, 2 312, . . . , N 314 from a system that has failed may be collected. Note it is not limited whether these log files come from one identical system or not, and instead the log files may come from the same or different systems; also it is not limited here whether these systems belong to the same type or not, and instead one system may be a server system for banking and the other one may be a server system for e-business.

Log patterns may be extracted from various logs (as shown by arrow A), and a pattern repository 320 is built based on the extracted log patterns. Next, logs 1 310, 2 312, . . . , N 314 are mapped to corresponding vectors based on log patterns in the pattern repository, and a vector repository is built based on these vectors (as shown by arrow B). In other words, a vector may be used as the unique identifier of a log. Subsequently, multiple vectors in vector repository 330 are clustered into different groups so that each group is representative of one trouble type.

Further, while receiving a new log from a new system, the new log may be mapped to a new vector through the extraction and mapping method shown in steps A and B. Then, by comparing the new vector with historic vectors that have been clustered into a different group, a historic vector that is almost/nearly similar to the new vector can be found, and the trouble type of the historic vector can used as the starting point of analyzing the trouble type of the new system.

Figure 4:
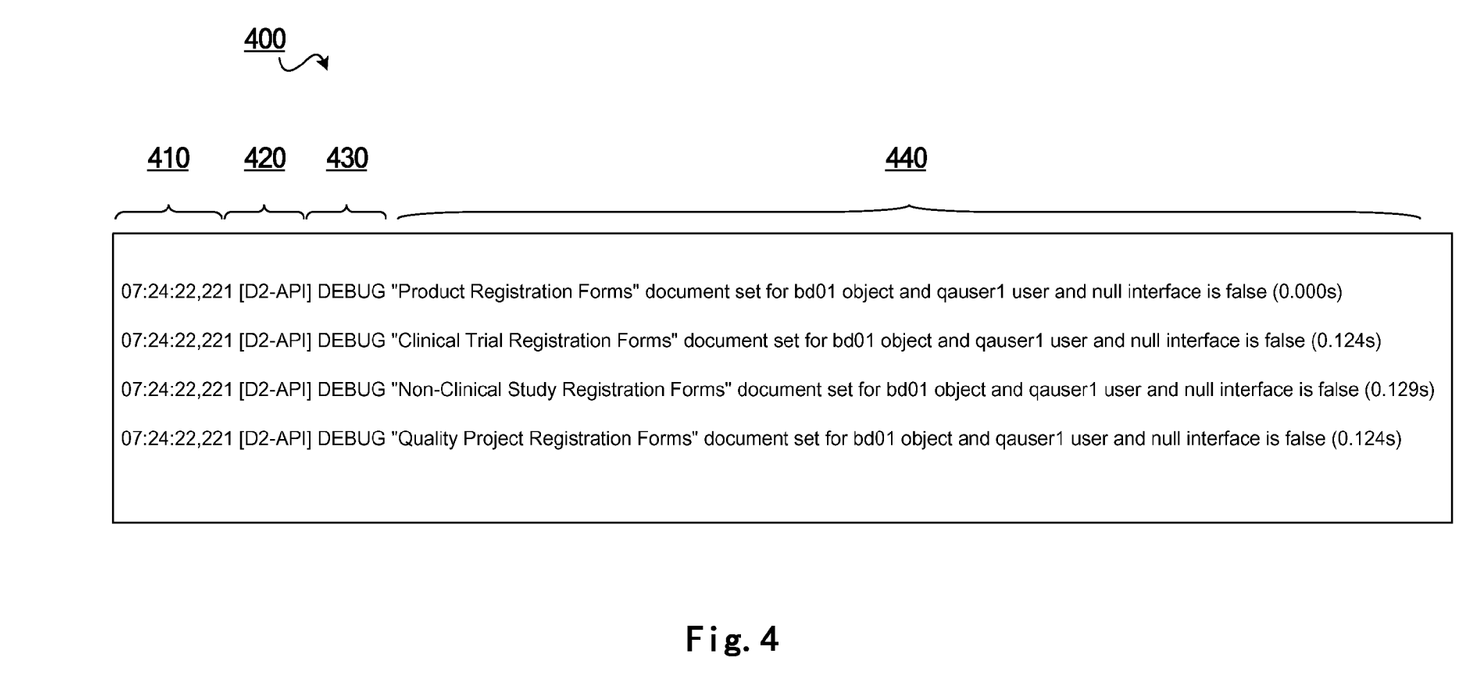
FIG. 4 schematically illustrates a schematic view of a log file according to one embodiment of the present invention.

First, description is presented to the structure of a log file. FIG. 4 schematically illustrates a schematic view 400 of a log file according to one embodiment of the present invention. Note the log file has a semi-structured data structure, and FIG. 4 schematically illustrates only 4 lines of log. With reference to numeral 410, the header of each line of log may indicate collected timestamp information of the line of log, e.g., "07:23:22,221;" then, the portion denoted by numeral 420 is module information, representing a module that produces the line of log, e.g., "[D2-API]"; the portion denoted by numeral 430 is log level, representing a level to which the log belongs, e.g., "DEBUG;" the last portion 440 represents a log message, e.g., "Product Registration Forms" document set for bd01 object and qauser1 user and null interface is false (0.000 s).

In the embodiments of the present invention, the log message refers to the remaining portion of a line of log from which the timestamp, module information and log level are filtered. FIG. 4 illustrates a feasible structure of a log file by way of example only; when the log file has other data structure, those skilled in the art may extract the log message based on the principle as described above. In the context of the present disclosure, analyzing log similarity in general refers to analyzing text similarity between log messages.

In one embodiment of the present invention, there is provided a method for troubleshooting based on log similarity, comprising: extracting log patterns from a plurality of (herein after also referred to as multiple throughout the description) log files in response to having collected the multiple log files from at least one system with troubles, the log pattern describing a regular expression to which a log message in a log file among the multiple log files conforms; building a pattern repository using the log patterns; mapping each of the multiple log files to an n-dimensional vector based on the pattern repository; and clustering multiple n-dimensional vectors to which each of the multiple log files is mapped into at least one group, wherein each of the at least one group indicates one trouble type of the at least one system.

Figure 5:
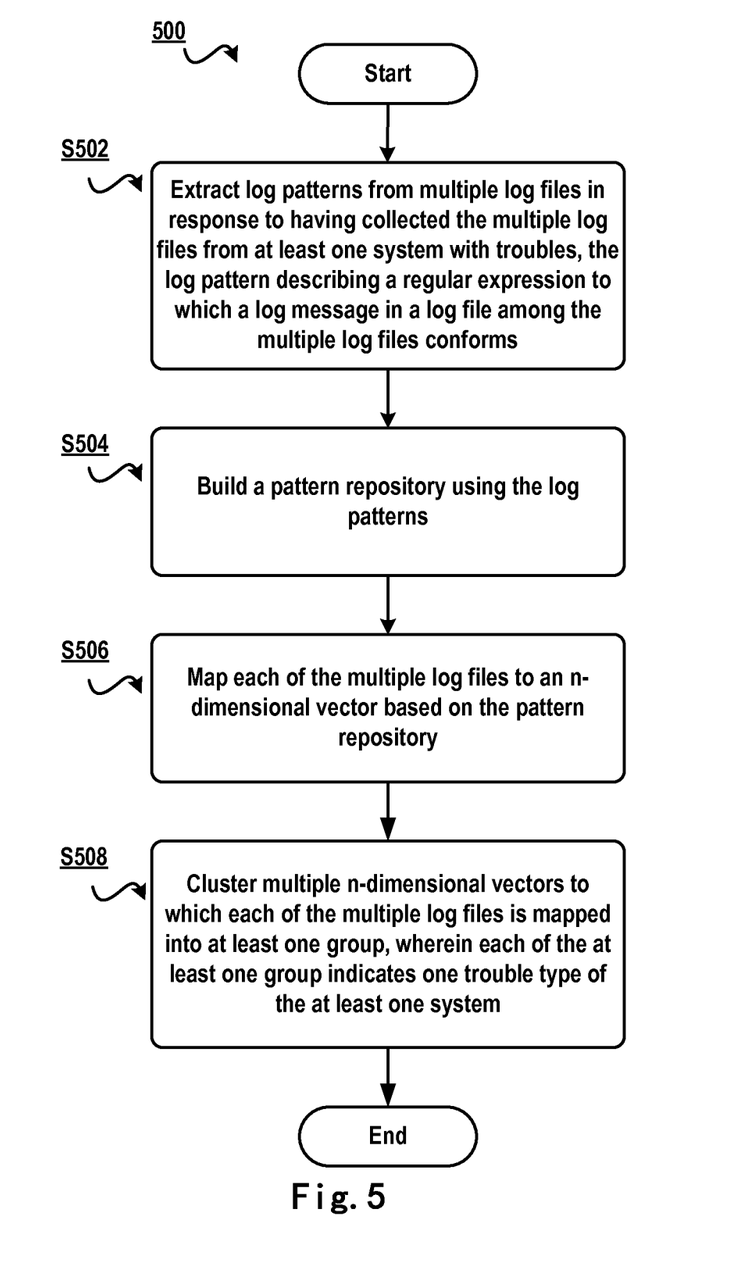
FIG. 5 schematically illustrates a flowchart of a method for troubleshooting based on log similarity according to one embodiment of the present invention.

With reference to FIG. 5, this figure schematically illustrates a flowchart 500 of a method for troubleshooting based on log similarity according to one embodiment of the present invention. Specifically, in step S502 in response to having collected multiple log files from at least one system with troubles, extract log patterns from the multiple log files, the log pattern describing a regular expression to which a log message in a log file among the multiple log files conforms.

In one embodiment of the present invention, the log pattern is extracted by "line." In other words, one line of message may correspond to one log pattern. Detailed description is presented below to the meaning of the log pattern. For simplifying description, suppose one log file is composed of 8 lines of messages, for example, the 8 lines of messages may be identified as M1-M8:

M1=Create "Auditing Projects" for 123321 object
M2=Delete "Auditing Projects" for 321123 object
M3=Create "Bank Documents" for 12345 object
M4=Delete "Bank Documents" for 53412 object
M5=Create "Test Plans" for 12345 object
M6=Create "Clinical Trials" for 553689 object
M7=Delete "Test Plans" for 53412 object
M8=Delete "Clinical Trials" for 55378 object When the development of a system is completed, types of log messages associated with the system will not change. The amount of log patterns produced during the running of the system is also fixed. Although one log file might record millions or even tens of millions of lines of log messages, the amount of regular expressions (log patterns) to which these log messages belong is usually only hundreds of orders of magnitude. Therefore, the computation overhead can be reduced greatly by extracting a log pattern from each line of log message and using the log pattern as a basis for subsequent processing.

Usually there are two types of log messages: (1) comprising variables and constants, e.g., "Create document set Bank1 for object 12345 failed" mentioned above, wherein "Bank1" and "12345" are variables and the other portion is constants; (2) comprising constants only, e.g., "Java heap out of memory" mentioned above.

By processing the foregoing log file, two log patterns can be extracted:

Pattern 1: Create <variable> for <variable> object; and
Pattern 2: Delete <variable> for <variable> object.

In this example, the log pattern of log messages M1, M3, M5 and M6 is Pattern 1, while the log pattern of log messages M2, M4, M7 and M8 is Pattern 2.

Next, in step S504 build a pattern repository using the log patterns. Note log patterns extracted from different log messages may be the same. In this step, a pattern repository is built using different the log patterns.

In step S506, map each of the multiple log files to an n-dimensional vector based on the pattern repository. To identify each log file in a more simple way, each log file may be mapped to an n-dimensional vector. Note since each line of log message in a log file corresponds to a log pattern, at this point mapping may be realized based on log patterns in the pattern repository.

Finally in step S508 cluster multiple n-dimensional vectors to which each of the multiple log files is mapped into at least one group, wherein each of the at least one group indicates one trouble/failure type associated with at least one system.

Since each log file has been mapped to an n-dimensional vector in step S506, then the log files are clustered by clustering multiple n-dimensional vectors that correspond to the multiple log files in step S508. In addition, since each log file represents an instance of one trouble/failure, failures occurring in the system can be clustered by clustering the n-dimensional vectors, i.e., each group resulting from the clustering indicates one trouble type of the at least one system.

In one embodiment of the present invention, extracting log patterns from multiple log files in response to having collected the multiple log files from the at least one system with troubles comprises: with respect to a current log file among the multiple log files, extracting the log patterns from log messages in the current log file, and in a preferred embodiment from two lines of log messages in the current log file.

Specifically, various log messages in a log file may be pairwise combined, and a log pattern is extracted from each pair of log messages. For example, log message pairs (M1, M2), (M1, M3), (M1, M4), . . . , (M7, M8) can be obtained by combining any two of M1-M8. Then, a log pattern corresponding to each log message can be obtained by extracting the same portion from each pair.

In one embodiment of the present invention, extracting the log patterns from two lines of log messages in the current log file comprises: calculating the longest common subsequence of the two lines of log messages so as to extract the log patterns.

Two log messages may be represented as respective strings $X_i=\{x_1, x_2, \ldots, x_i\}$ and $Y_j=\{y_1, y_2, \ldots, y_j\}$ formed by consecutive words, and the longest common subsequence between the two log messages may be defined as:

$$LCS(X_i, Y_j) = \begin{cases} \varnothing & \text{if } i = 0 \text{ or } j = 0 \\ (LCS(X_{i-1}, Y_{j-1}), x_i) & \text{if } x_i = y_j \\ \text{longest}(LCS(X_i, Y_{j-1}), LCS(X_{i-1}, Y_j)) & \text{if } x_i \neq y_j \end{cases}$$

For example, a log pattern "<variable> Auditing Projects for <variable> object" can be obtained from the log message pair (M1, M2), and a log pattern "Create <variable> for <variable> object" can be obtained from the log message pair (M1, M3). Likewise, other log pattern can be obtained, such as "Delete <variable> for <variable> object," etc.

In one embodiment of the present invention, building a pattern repository using the log patterns comprises: in response to the occurrence frequency of a log pattern "p" among the log patterns exceeding a predefined threshold, adding the log pattern "p" into the pattern repository.

Those skilled in the art may define a value of the predefined threshold by themselves, for example, setting the threshold as 3 or other value. The purpose of discarding a log pattern whose occurrence frequency is lower than the predefined threshold is to ignore some trivial log patterns with small frequency. In the example described above, when the threshold is set as 3, the log pattern "<variable> Auditing Projects for <variable> object" will be discarded.

Figure 6:
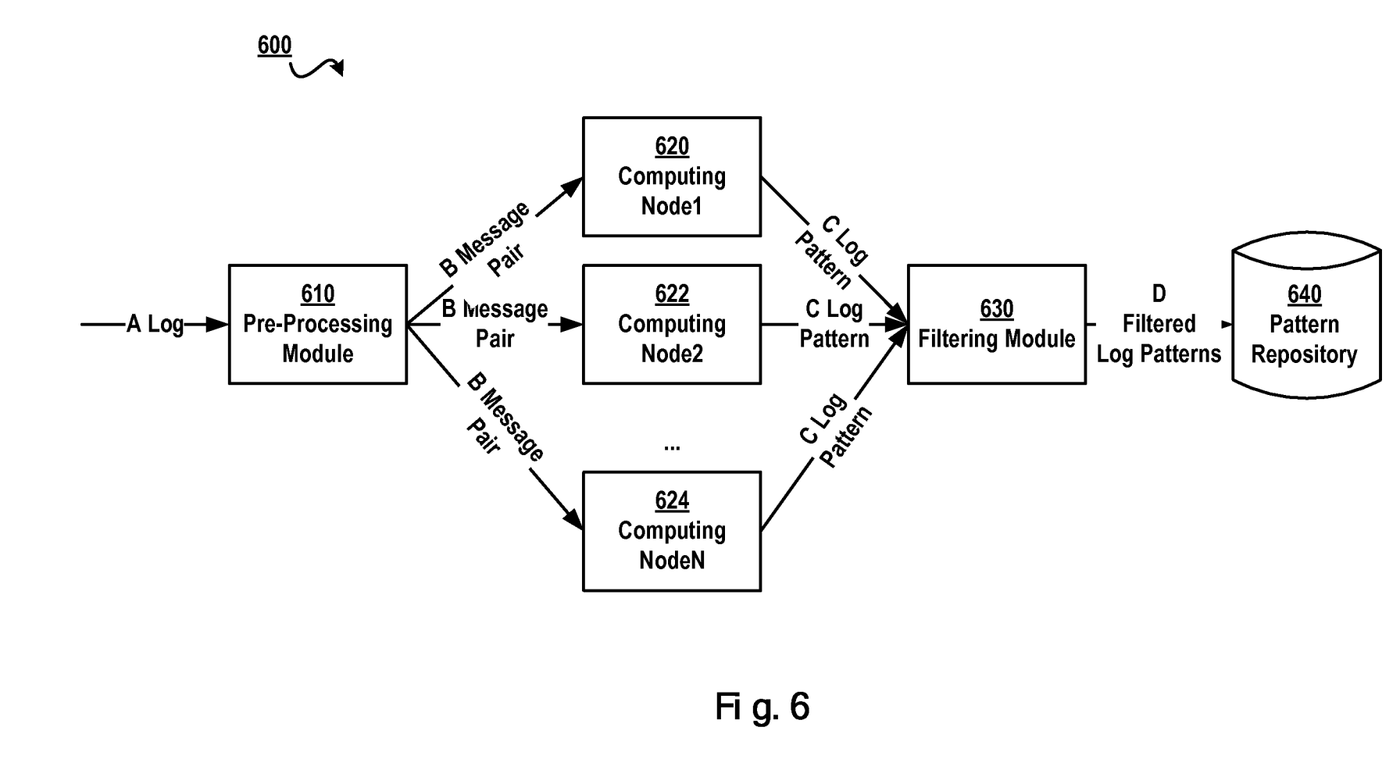
FIG. 6 schematically illustrates a schematic view of extracting a log file and building a pattern repository based on the extracted log file according to one embodiment of the present invention.

FIG. 6 schematically illustrates a schematic view 600 of extracting a log file and building a pattern repository based on the extracted log file according to one embodiment of the present invention. A pre-processing module 610 may process a log file from a failing/troubled system. For example, according to the structure of the log file as shown in FIG. 4, first, contents of the log message portion as shown by reference numeral 440 may be extracted from the log file (as shown by arrow A); subsequently, log messages are pairwise combined to form message pairs (as shown by arrow B). Then, a log pattern can be extracted from each message pair using the above-described longest common subsequence algorithm in the computation node.

Those skilled in the art may understand with the development of distributed computing techniques, computation tasks may be deployed at multiple computation nodes. A log file usually consists of millions of lines of log messages, and also the amount of pairs formed by combining these log messages is huge. Performing the task of extracting log patterns at multiple computation nodes in parallel helps to increase the time efficiency of data processing. Those skilled in the art may use various distributed processing techniques that are currently known or to be developed in future to realize the extraction operation, which is not detailed here.

In one embodiment of the present invention, while pre-processing module 610 conducts processing, a filtering condition may be set with respect to logs, for example, log messages during a specific time period (e.g., in the last 1 hour) are selected, log messages whose module information is a specific value (e.g., [D2-API]) are selected, or log messages with a specified log level (e.g., DEBUG level) are selected, etc.

Suppose there exist w log files, then presented below is a technique of to how to map one j of the w log files to an n-dimensional vector. Other techniques may be used to perform this and such techniques falls within the scope of the present disclosure. In one embodiment of the present invention, the mapping each of the multiple log files to an n-dimensional vector based on the pattern repository comprises: with respect to a log file j among the multiple log files, matching each line of log message k in the log file j to a corresponding log pattern $p_k$ in the pattern repository; transforming the log file j into a sequence $f_j$ of the corresponding log pattern $p_k$; and mapping the sequence $f_j$ to an n-dimensional vector.

According to the method of the present invention, each log file may be mapped to an n-dimensional vector which is then used as an identifier of the log file. Specifically, with respect to each log file j, since description has been presented above as to how to obtain a log pattern corresponding to a log message (i.e., a regular expression to which the log message belongs), each line of log message may be matched to a corresponding log pattern $p_k$ in the pattern repository.

Continuing the foregoing example, suppose the current pattern repository consists of 3 log patterns:
p1: Create <variable> for <variable> object
p2: Delete <variable> for <variable> object
p3: Java heap out of memory At this point log message M1 may be matched to p1, M2 to p2, and M3 to p1, etc. Next, the log file j may be transformed into a sequence $f_j$ of the corresponding log pattern $p_k$, at which point $f_j=\{p_1, p_2, p_1, p_2, p_1, p_1, p_2, p_2\}$. Subsequently, the sequence $f_j$ is mapped to an n-dimensional vector.

In one embodiment of the present invention, dimension n of the n-dimensional vector is equal to the amount of log patterns in the pattern repository. In the foregoing example, since the pattern repository consists of 3 log patterns, at this point the sequence $f_j$ may be mapped to a 3-dimensional vector.

In one embodiment of the present invention, the mapping the sequence $f_j$ to an n-dimensional vector comprises: with respect to a log pattern $p_i$ in the pattern repository, calculating an eigenvalue $tfidf_{i,j}$ associated with the sequence $f_j$ and the log pattern $p_i$, the eigenvalue $tfidf_{i,j}$ being associated with the occurrence frequency of the log pattern $p_i$ in multiple sequences corresponding to the multiple log files; and treating the eigenvalue $tfidf_{i,j}$ as the $i^{th}$ component in the n-dimensional vector to build the n-dimensional vector.

In this embodiment, with respect to the $i^{th}$ log pattern in the pattern repository, an eigenvalue of the sequence in relation to the $i^{th}$ log pattern may be calculated, and subsequently the obtained eigenvalue is used as the $i^{th}$ component of the n-dimensional vector. Specifically, for example regarding the sequence $f_j$ shown above, corresponding eigenvalues $tfidf_{1,j}$, $tfidf_{2,j}$ and $tfidf_{3,j}$ may be calculated with respect to the three log patterns p1, p2 and p3 in the pattern repository, and the n-dimensional vector obtained at this point may be represented as: $\vec{f}_j=(tfidf_{1,j}, tfidf_{2,j}, tfidf_{3,j})$.

Specifically, the eigenvalue $tfidf_{i,j}$ is associated with the term frequency $tf_{i,j}$ of the log pattern $p_i$ and with the inverse document frequency $idf_i$ of the log pattern $p_i$. In this embodiment, the eigenvalue $tfidf_{i,j}$ can be used for evaluating the importance of the specific log pattern $p_i$ for a log file j among the multiple log files. The importance increases in direct proportion to occurrences of the log pattern $p_i$ in the log file j, and also decreases in inverse proportion to occurrences of the log pattern $p_i$ in all log files.

In one embodiment of the present invention, the eigenvalue may be defined as a cross product of the term frequency and the inverse document frequency: $tfidf_{i,j}=tf_{i,j} \times idf_i$. In one embodiment of the present invention, a method below is used to calculate the term frequency $tf_{i,j}$ and the inverse document frequency $idf_i$.

Continuing the foregoing example, since there exist 3 log patterns in the pattern repository, the sequence $f_j$ will be mapped to a 3-dimensional vector. Suppose at this point there exist 10 log patterns (w=10), then a value of each component in the 3-dimensional vector is calculated. And a value of the $1^{st}$ component is calculated.

The term frequency $$tf_{i,j} = \frac{t_{i,j}}{\sum_u t_{u,j}},$$

where $t_{i,j}$ represents an occurrence number of the log pattern $p_i$ in the sequence $f_j$, and $\sum_u t_{u,j}$ represents a sum of occurrence numbers of all log patterns in the pattern repository in the sequence $f_j$.

Continuing the foregoing example, with respect to the sequence $f_j=\{p_1, p_2, p_1, p_2, p_1, p_1, p_2, p_2\}$, the occurrence number of the log pattern p1 in this sequence equals 4, the occurrence number of the log pattern p2 in this sequence equals 4, and the occurrence number of the log pattern p3 in this sequence equals 0. Then, at this point the term frequency, $$tf_{1,j} = \frac{t_{1,j}}{\sum_u t_{u,j}} = \frac{4}{4+4+0} = 0.5.$$

The inverse document frequency $$idf_i = \log \frac{|F|}{1 + \{v: p_i \in f_v\}},$$

where |F| represents the amount of the multiple log files, and $\{v: p_i \in f_v\}$ represents the amount of sequences comprising the log pattern $p_i$. At this point, the amount of log files equals 10, so |F|=10. Suppose only the sequence $f_j$ comprises the log pattern p1, then the inverse document frequency is $$idf_1 = \log \frac{|F|}{1 + \{v: p_1 \in f_v\}} = \log \frac{10}{1+1} = \log 5.$$

At this point, the value of the $1^{st}$ component in the 3-dimensional vector equals $tfidf_{1,j} = tf_{1,j} \times idf_1 = 0.5 \times \log 5$. Similarly, those skilled in the art can further obtain values of other components in the 3-dimensional vector.

Note a concrete formula for calculating the eigenvalue has been shown for the purpose of illustration only. Based on the principle described in this specification, those skilled in the art may further use other formula for calculation.

In one embodiment of the present invention, Unweighted Pair-Group Method with Arithmetic Means (UPGMA) can be used. The algorithm is a clustering analysis method for solving categorization. The algorithm employs an agglomerative clustering method. Suppose, there exist w log files, then initially there exist a total of w groups. First, a pair of n-dimensional vectors with the highest similarity is clustered into a group; then, comparison is made as to which pair in the remaining (w−1) groups has the highest similarity, and this pair is clustered into a group; through repeated calculation as such, all clustering analysis is completed finally.

When calculating the similarity between two n-dimensional vectors, the similarity is calculated by comparing the cosine similarity between the two n-dimensional vectors. For example, the cosine similarity between n-dimensional vectors $\vec{f}_a$ and $\vec{f}_b$ that correspond to two log files respectively may be defined as:

$$SIM(\vec{f}_a, \vec{f}_b) = \frac{\vec{f}_a \cdot \vec{f}_b}{|\vec{f}_a| \times |\vec{f}_b|}$$

Where the numerator is a dot product of the two n-dimensional vectors, and the denominator is a cross product of modulus of the two-dimensional vectors. In one embodiment of the present invention, those skilled in the art may further use other method to calculate the similarity between two n-dimensional vectors, e.g., simply using Euclidean distance to represent the similarity, and such methods fall under the scope of the present disclosure.

With the method described above, it is possible to process multiple log files from one or more failing systems based on log similarity, and cluster these log files into groups representing different failure types of the troubled/failing systems. For example, these groups may represent such failure types as processor failure, memory leak and so on. In one embodiment of the present invention, the failure type of each group may be specified by a technical expert.

Based on the groups mentioned above, the present disclosure further provides a method for troubleshooting based on log similarity, comprising: calculating similarity between a new log file and multiple vectors in at least one group in response to having received the new log file from the system, the at least one group being obtained based on the method/technique described above; and treating a failure type indicated by a group to which a vector with the highest similarity belongs as a failure type of the system.

Where groups indicative of different failure types have been obtained, when receiving a new log file from a new failing system, a failure type of a log file having the highest log similarity with the new log file may be used as a failure type of the new failing system. In this manner, the most possible failure type of a failing system can be learned in advance, and then a technical engineer having the richest experience in handling such type of failure can be dispatched. Therefore, human and material costs can be saved, and technical engineers can bring their experience to the fullest extent in solving the failure/troubles.

In one embodiment of the present invention, the calculating the similarity between a new log file and multiple vectors in at least one group in response to having received the new log file from a system comprises: based on the pattern repository in the above method, mapping the new log file to an n-dimensional vector; and calculating the similarity between the n-dimensional vector and the multiple vectors.

The new log file may be mapped to a new n-dimensional vector $\vec{A}$ by using the above method; subsequently, by means of the above similarity calculating method (e.g., cosine similarity or Euclidean distance), an n-dimensional vector $\vec{B}$ having the highest similarity with the new n-dimensional vector is obtained, and a failure type indicated by a group to which the n-dimensional vector $\vec{B}$ belongs is used as a failure type of the new failing system.

Figure 7:
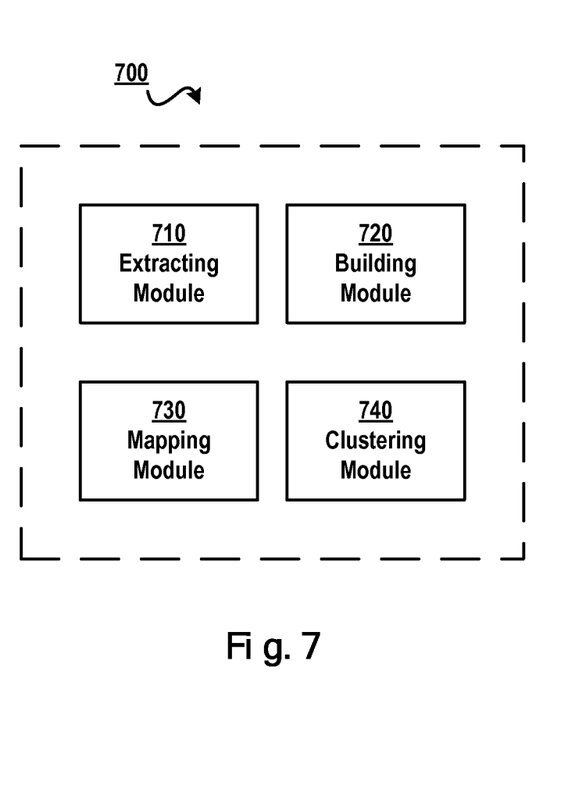
FIG. 7 schematically illustrates a block diagram of an apparatus for troubleshooting according to one embodiment of the present invention.

FIG. 7 schematically illustrates a block diagram 700 of an apparatus for troubleshooting based on log similarity according to one embodiment of the present invention. Specifically, FIG. 7 illustrates an apparatus for troubleshooting based on log similarity, comprising: an extracting module 710 configured to extract log patterns from multiple log files in response to having collected the multiple log files from at least one system with troubles, the log pattern describing a regular expression to which a log message in a log file among the multiple log files conforms; a building module 720 configured to build a pattern repository using the log patterns; a mapping module 730 configured to map each of the multiple log files to an n-dimensional vector based on the pattern repository; and a clustering module 740 configured to cluster multiple n-dimensional vectors to which each of the multiple log files is mapped into at least one group, wherein each of the at least one group indicates one trouble type of the at least one system. In an alternative advantageous embodiment, a single log module can replace the extracting module, the building module and the mapping module. Each module being described herein is for illustrative purpose and one of more of these modules may be combined to collectively perform the tasks associated with each single module.

In one embodiment of the present invention, extracting module 710 comprises: a first extracting module configured to, with respect to a current log file among the multiple log files, extract the log patterns from two lines of log messages in the current log file.

In one embodiment of the present invention, the first extracting module comprises: a second extracting module configured to calculate the longest common subsequence of the two lines of log messages so as to extract the log patterns. The tasks individually performed by the first extracting module and the second extracting module can be collectively and additionally performed by the extracting module.

In one embodiment of the present invention, mapping module 730 comprises: a matching module configured to, with respect to a log file j among the multiple log files, match each line of log message k in the log file j to a corresponding log pattern $p_k$ in the pattern repository; a transforming module configured to transform the log file j into a sequence $f_j$ of the corresponding log pattern $p_k$; and a first mapping module configured to map the sequence $f_j$ to an n-dimensional vector. Again, the tasks performed by the individual modules can be collectively and additionally performed by the mapping module.

In one embodiment of the present invention, dimension n of the n-dimensional vector is equal to the amount of log patterns in the pattern repository.

In one embodiment of the present invention, the first mapping module comprises: a calculating module configured to, with respect to a log pattern $p_i$ in the pattern repository, calculate an eigenvalue $tfidf_{i,j}$ associated with the sequence $f_j$ and the log pattern $p_i$, the eigenvalue $tfidf_{i,j}$ being associated with the occurrence frequency of the log pattern $p_i$ in multiple sequences corresponding to the multiple log files; and a generating module configured to treat the eigenvalue $tfidf_{i,j}$ as the $i^{th}$ component in the n-dimensional vector to build the n-dimensional vector. Again, the tasks performed by the individual modules can be collectively and additionally performed by the mapping module In one embodiment of the present invention, the eigenvalue $tfidf_{i,j}$ is associated with the term frequency $tf_{i,j}$ of the log pattern $p_i$ and with the inverse document frequency $idf_i$ the log pattern $p_i$.

In one embodiment of the present invention, $tfidf_{i,j} = tf_{i,j} \times idf_i$.

Further, in one embodiment of the present invention, $$tf_{i,j} = \frac{t_{i,j}}{\sum_u t_{u,j}},$$

where $t_{i,j}$ represents an occurrence number of the log pattern $p_i$ in the sequence $f_j$, and $\Sigma_u t_{u,j}$ represents a sum of occurrence numbers of all log patterns in the pattern repository in the sequence $f_j$; and $$idf_i = \log \frac{|F|}{1 + \{v: p_i \in f_v\}},$$

where |F| represents the amount of the multiple log files, and $\{v: p_i \in f_v\}$ represents the amount of sequences comprising the log pattern $p_i$.

In one embodiment of the present invention, building module 720 comprises: a selecting module configured to, in response to the occurrence frequency of a log pattern p among the log patterns exceeding a predefined threshold, add the log pattern p into the pattern repository. Again, the tasks performed by the individual modules can be collectively and additionally performed by the mapping these modules to one of the main module.

In one embodiment of the present invention, there is provided an apparatus for troubleshooting based on log similarity, comprising: a similarity calculating module configured to calculate similarity between a new log file and multiple vectors in at least one group in response to having received the new log file from the system, the at least one group being obtained based on the apparatus described above; and a specifying module configured to treat a failure type indicated by a group to which a vector with the highest similarity belongs as a failure type of the system. Again, the tasks performed by the individual modules can be collectively and additionally performed by the mapping these modules to one of the main module.

In one embodiment of the present invention, the similarity calculating module comprises: a vector mapping module configured to map the new log file to an n-dimensional vector based on the pattern repository in the above apparatus; and a vector similarity calculating module configured to calculate the similarity between the n-dimensional vector and the multiple vectors. Again, the tasks performed by the individual modules can be collectively and additionally performed by the mapping these modules to one of the main module. Mapping each of the sub modules to a main module such that the tasks performed by these sub modules can be performed collectively and additionally by the one of the main modules reduces the number of components in the apparatus.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for trouble shooting based on log similarity, the method comprising:
   extracting log patterns from a plurality of log files in response to having collected the plurality of log files from at least one system with troubles, each log pattern describing a regular expression to which a log message in a log file among the plurality of log files conforms;
   building a pattern repository using the log patterns extracted;
   mapping each of the plurality of log files to an n-dimensional vector based on the pattern repository; and
   clustering a plurality of n-dimensional vectors to which each of the plurality of log files is mapped into at least one group, wherein each of the at least one group indicates one trouble type of the at least one system;
   wherein the mapping each of the plurality of log files to an n-dimensional vector based on the pattern repository comprises: with respect to a log file j among the plurality of log files,
   matching each line of log message k in the log file j to a corresponding log pattern $p_k$ in the pattern repository;
   transforming the log file j into a sequence $f_j$ of the corresponding log pattern $p_k$; and
   mapping the sequence $f_j$ to an n-dimensional vector;
   wherein dimension n of the n-dimensional vector is proportional to the amount of log patterns in the pattern repository;
   wherein mapping the sequence $f_j$ to an n-dimensional vector comprises: with respect to a log pattern $p_i$ in the pattern repository,
   calculating an eigenvalue tfidf$_{i,j}$, , wherein tfidf$_{i,j}$=tf$_{i,j}$× idf$_i$; the eigenvalue tfidf$_{i,j}$ associated with the sequence $f_j$ and the log pattern $p_i$, and the eigenvalue tfidf$_{i,j}$ associated with an occurrence frequency of the log pattern $p_i$ in a plurality of sequences corresponding to the plurality of log files; and
   treating the eigenvalue tfidf$_{i,j}$ as the $i^{th}$ component in the n-dimensional vector to build the n-dimensional vector.

2. The method according to claim 1, wherein the extracting log patterns from plurality of log files in response to having collected the plurality log files from the at least one system with troubles comprises: with respect to a current log file among the plurality of log files,
   extracting the log patterns from the log messages in the current log file.

3. The method according to claim 2, wherein the extracting the log patterns from the log messages in the current log file comprises:
   calculating the longest common subsequence of the log messages to extract the log patterns.

4. The method according to claim 1, wherein the eigenvalue tfidf$_{i,j}$ is associated with the term frequency tf$_{i,j}$ of the log pattern $p_i$ and with the inverse document frequency idf$_i$ of the log pattern $p_i$.

5. The method according to claim 4, wherein $$tf_{i,j} = \frac{t_{i,j}}{\sum_u t_{u,j}},$$

where $t_{i,j}$ represents an occurrence number of the log pattern $p_i$ in the sequence $f_j$; $\Sigma_u t_{u,j}$ represents a sum of occurrence numbers of all log patterns in the pattern repository in the sequence $f_j$; and $$idf_i = \log \frac{|F|}{1 + \{v: p_i \in f_v\}},$$

where |F| represents the amount of the plurality of log files, and $\{v: p_i \in f_v\}$ represents the amount of sequences comprising the log pattern $p_i$.

6. The method according to claim 1, wherein the building a pattern repository using the log patterns comprises:
   in response to an occurrence frequency of a log pattern p among the log patterns exceeding a predefined threshold, adding the log pattern p into the pattern repository.

7. The method according to claim 6, further comprising
   calculating similarity between a new log file and the plurality of vectors in at least one group in response to having received the new log file from a system;
   treating a failure type indicated by a group to which a vector with the highest similarity belongs as a failure type of the system;
   mapping the new log file to the n-dimensional vector; and
   calculating the similarity between the n-dimensional vector and the plurality of vectors.

8. An apparatus for trouble shooting based on log similarity, comprising:
   a processor;
   memory in communication with the processor;
   a log module, via the processor and memory, extracting log patterns from a plurality of log files in response to having collected the plurality of log files from at least one system with troubles, each log pattern describing a regular expression to which a log message in a log file among the plurality of log files conforms;
   a building module, via the processor and memory, building a pattern repository using the log patterns extracted;
   a mapping module, via the processor and memory, mapping each of the plurality of log files to an n-dimensional vector based on the pattern repository; and
   a clustering module, via the processor and memory, clustering a plurality of n-dimensional vectors to which each of the plurality of log files is mapped into at least one group, wherein each of the at least one group indicates one trouble type of the at least one system;
   wherein the mapping module is configured to, with respect to a log file j among the plurality of log files, match each line of log message k in the log file j to a corresponding log pattern $p_k$ in the pattern repository;
   transform the log file j into a sequence $f_j$ of the corresponding log pattern $p_k$; and
   map the sequence $f_j$ to an n-dimensional vector;
   wherein dimension n of the n-dimensional vector is proportional to the amount of log patterns in the pattern repository;
   wherein the mapping module is configured to, with respect to a log pattern $p_i$ in the pattern repository, calculate an eigenvalue tfidf$_{i,j}$ wherein tfidf$_{i,j}$=tf$_{i,j}$×idf$_i$; the eigenvalue tfidf$_{i,j}$ associated with the sequence $f_j$ and the log pattern $p_i$, and the eigenvalue tfidf$_{i,j}$ associated with an occurrence frequency of the log pattern $p_i$ in multiple sequences corresponding to the plurality of log files; and further configured to treat the eigenvalue tfidf$_{i,j}$ as the i$^{th}$ component in the n-dimensional vector to build the n-dimensional vector.

9. The apparatus according to claim 8, wherein the extracting module is further configured to
extract the log patterns from the log messages in the current log file.

10. The apparatus according to claim 9, wherein the extracting module is further configured to:
calculate the longest common subsequence of the log messages so as to extract the log patterns.

11. The apparatus according to claim 8, wherein the eigenvalue tfidf$_{i,j}$ is associated with the term frequency tf$_{i,j}$ of the log pattern p$_i$ and with the inverse document frequency idf$_i$ of the log pattern p$_i$.

12. The apparatus according to claim 11, wherein $$tf_{i,j} = \frac{t_{i,j}}{\sum_u t_{u,j}},$$

where t$_{i,j}$ represents an occurrence number of the log pattern p$_i$ in the sequence f$_j$, $\Sigma_u t_{u,j}$ represents a sum of occurrence numbers of all log patterns in the pattern repository in the sequence f$_j$; and $$idf_i = \log\frac{|F|}{1 + \{v: p_i \in f_v\}},$$

where |F| represents the amount of the plurality of log files, and {v:p$_i \in$ f$_v$} represents the amount of sequences comprising the log pattern p$_i$.

13. The apparatus according to claim 9, wherein the building module is further configured to, in response to an occurrence frequency of a log pattern p among the log patterns exceeding a predefined threshold, add the log pattern p into the pattern repository.

14. The apparatus as claimed in claim 9 is further configured to calculate similarity between a new log file and the plurality of vectors in at least one group in response to having received the new log file from a system;
treat a failure type indicated by a group to which a vector with the highest similarity belongs as a failure type of the system;
map the new log file to the n-dimensional vector based on the pattern repository; and
calculate the similarity between the n-dimensional vector and the plurality of vectors.

* * * * *